Aug. 18, 1964
T. L. MENGE, SR
3,144,791
SPEED REDUCER
Original Filed June 6, 1958
2 Sheets-Sheet 1
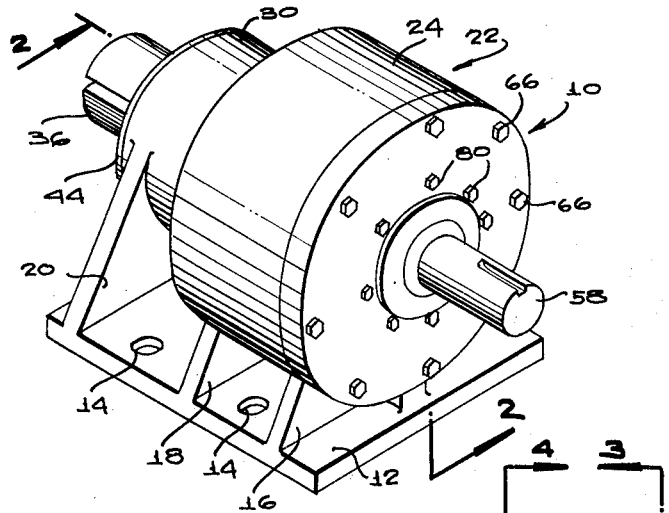
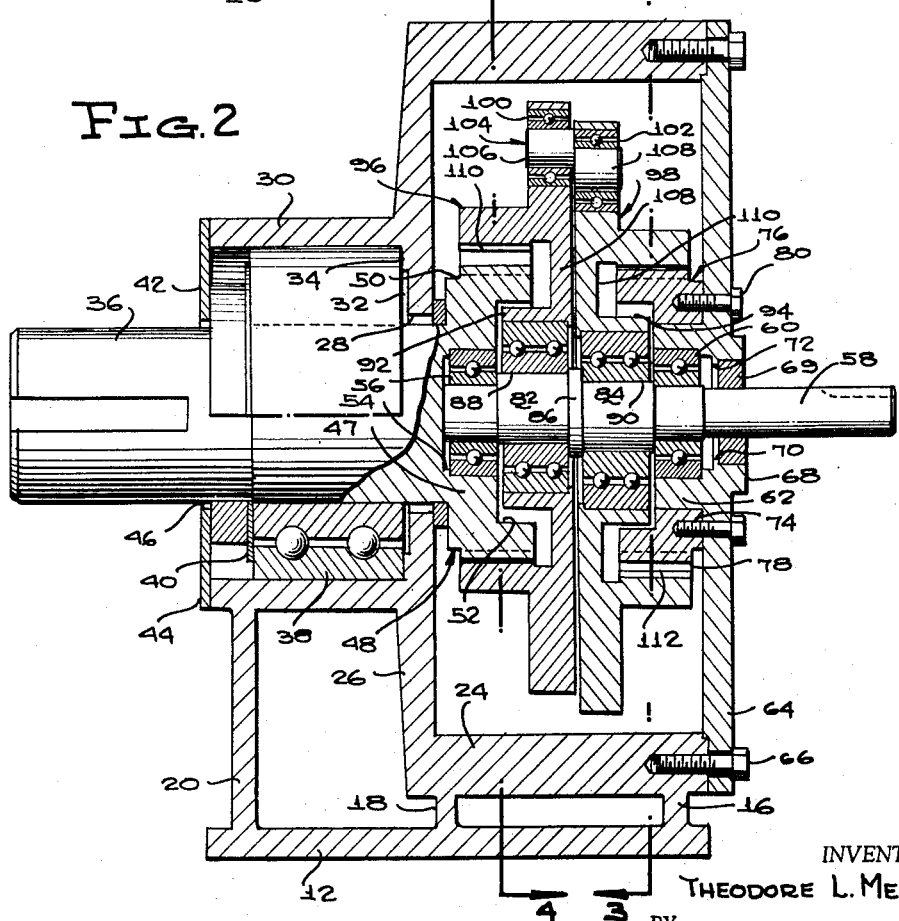
INVENTOR.
THEODORE L. MENGE, Sr.
BY
ATTORNEYS Aug. 18, 1964     T. L. MENGE, SR     3,144,791
SPEED REDUCER
Original Filed June 6, 1958     2 Sheets-Sheet 2
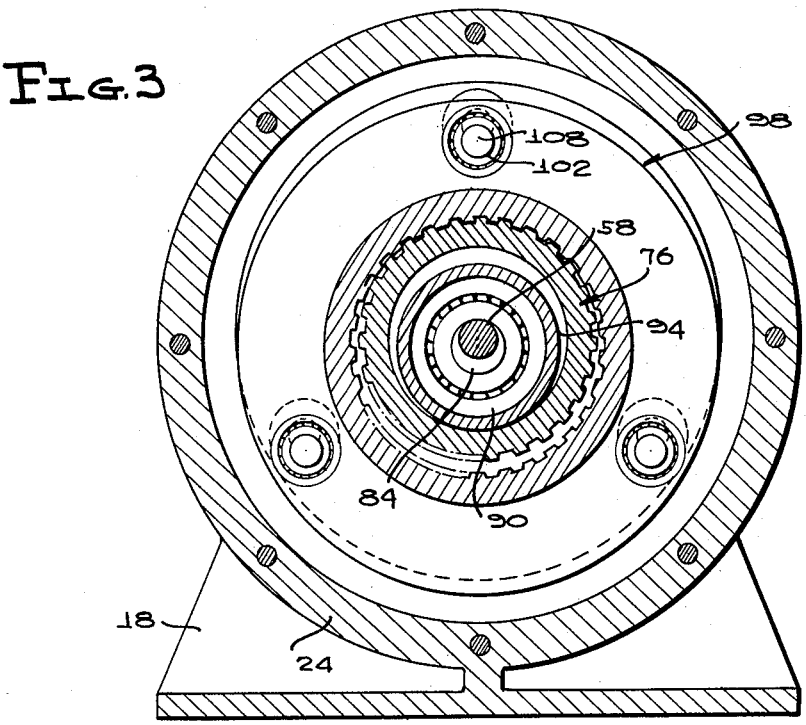
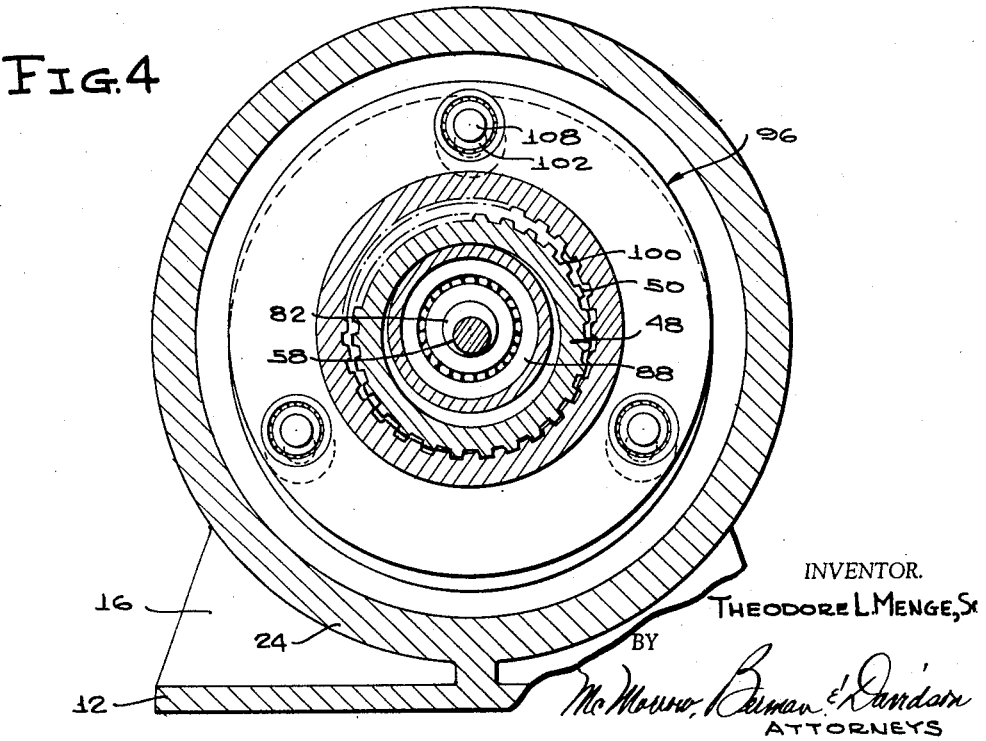
INVENTOR.
THEODORE L. MENGE, SR
BY
ATTORNEYS

United States Patent Office 3,144,791
Patented Aug. 18, 1964

3,144,791
SPEED REDUCER
Theodore L. Menge, Sr., Shreveport, La., assignor of sixteen and two-thirds percent to Aubry H. Temple, fifty percent to William C. Randolph, and thirty-three and one-third percent to Temple Iron Works, Inc., all of Shreveport, La.
Original application June 6, 1958, Ser. No. 740,364, now Patent No. 2,972,910, dated Feb. 28, 1961. Divided and this application Feb. 24, 1961, Ser. No. 91,546
1 Claim. (Cl. 74—804)

This invention relates to a gear train and, more specifically, the invention pertains to a gear train assembly especially designed for effecting the speed reduction of a power output shaft with respect to the speed of a power input shaft, this invention constituting a division of my copending application entitled "Speed Reducer," Serial No. 740,364, filed June 6, 1958, now Patent No. 2,972,910, dated February 28, 1961.

One of the primary objects of this invention is to provide a speed reducer which is essentially silent in operation and which is substantially free of vibration and pulsation.

Another object of this invention is to provide a speed reducer which will handle large loads and torques with ease and wherein substantially uniform torque and speed relations may be obtained.

A further object of this invention is to provide a speed reducer which will operate at a high efficiency and wherein the component elements thereof need not be manufactured with extremely close tolerances.

A still further object of this invention is to provide a speed reducer, the output shaft of which may be made to rotate in the same direction as the input shaft or in a direction contra to the direction of rotation of the input shaft, or, under some circumstances, the output shaft may be held at zero r.p.m. regardless of the direction of rotation of the input shaft or of its speed, all being accomplished without the interposition of clutch means.

Still another object of this invention is to provide a speed reducer including a gear train wherein the load is at all times distributed over a plurality of teeth instead of one, or at the most, two teeth, as in conventional trains of spur gears.

This invention contemplates, as a still further object thereof, the provision of a speed reducer which is noncomplex in construction and assembly, inexpensive to manufacture, and durable in use.

Other and further objects and advantages of the instant invention will become more evident from the consideration of the following specification when read in conjunction with the annexed drawings, in which:

FIGURE 1 is a perspective view of a speed reducer constructed in accordance with the instant invention;

FIGURE 2 is an enlarged detail cross-sectional view taken substantially on the vertical plane of line 2—2 of FIGURE 1, looking in the direction of the arrows;

FIGURE 3 is an enlarged detail cross-sectional view taken substantially upon the vertical plane of line 3—3 of FIGURE 2, looking in the direction of the arrows; and FIGURE 4 is an enlarged detail cross-sectional view taken substantially on the plane of line 4—4 of FIGURE 2, looking in the direction of the arrows.

Referring now more specifically to the several drawings, reference numeral 10 designates, in general, a speed reducer constructed in accordance with the teachings of this invention. The device 10 includes an elongated substantially rectangular base 12 having a plurality of bolt receiving transversely extending mounting apertures 14 projecting therethrough. Integral with the base and projecting laterally at substantially right angles from a side thereof are a plurality of webs 16, 18, 20 which, in turn, are integral with or otherwise rigidly secured to a substantially hollow cylindrical housing connoted, generally, by reference numeral 22. As is seen in FIGURES 1 and 2, the webs 16, 18 at their respective outer ends are integrally connected to the opposed ends, respectively, of the cylindrical side wall 24 of the housing 22, one end of the side wall 24 being closed by an end wall 26 having a central aperture 28 extending transversely therethrough to serve a function to be described.

The housing 22 also includes a substantially hollow cylindrical extension member 30 which projects laterally and outwardly from the end wall 26 in coaxial alignment with the aperture 28, and the end wall 26 immediately adjacent the latter is formed with a circumferential groove 32 giving rise to a circumferential shoulder 34, both of the latter being coaxial with respect to the aperture 28 and surrounded by the extension member 30. As is seen in the several figures of the drawings, the outer end of the extension member 30 is rigidly supported by the web 20 with which it is, preferably, integrally connected.

One end of the power output shaft 36 extends through the aperture 28 and is rotatably journalled in a roller bearing 38, the latter being press fit within the extension member 30 into abutting relation against the shoulder 34. The outer end of the power output shaft 36 projects beyond the outer end of the extension member 30 for connection with the work to be driven. Engaged around and abutting against the other side of the bearing 38 is an annular member 40 against which one side of an oil seal ring 42 abuts. As is seen in FIGURES 2 and 5, the oil seal ring 42 surrounds the shaft 36 and is disposed within the extension member 30 with its other side engaging against a keeper plate 44 which is centrally apertured at 46 to permit the outer end of the output shaft 36 to project loosely therethrough. Suitable means, conventional in the art, but not illustrated in the drawings, secure the keeper 44 to the outer end of the extension member 30.

The inner end of the power output shaft 36 is integrally connected with the hub 47 of an elongated spur gear 48 having a plurality of teeth 50 circumferentially spaced thereon and extending substantially parallel to the axis of the shaft 36. To serve functions to be described below, the inner side of the hub 47 is axially bored at 52, the inner end of which is in open communication with a coaxial counterbore 54, the latter having a roller bearing 56 press-fit therein.

The inner end of a power input shaft 58 is journalled for rotation in the bearing 56, and adjacent its outer end the shaft 58 is journalled for rotation in a roller bearing 60 press-fit within a substantially hollow cylindrical boss 62 which projects laterally from a side of a disc-shaped cover plate 64 releasably secured to the other end of the side wall 24 by bolts 66. As is seen in FIGURES 2 and 5, the cover plate 64 is also formed with an integral hollow cylindrical extending boss 68 coaxially aligned with the boss 62 and the common wall 70 therebetween is apertured at 72 to permit the outer end of the shaft 58 to project therethrough and through the boss 68 for extension therebeyond. The outer end of the shaft 58 is adapted for connection with a rotary power source not shown. As is seen in the drawings, the boss 68 receives an oil seal ring 69 that surrounds the shaft 58.

The hub 74 of a second spur gear 76 is centrally apertured and is telescoped over the boss 62, the spur gear 76 having a plurality of circumferentially spaced teeth 78 extending substantially parallel to the longitudinal axis of the shaft 58. Bolts 80 extend through the cover plate 64 and are threaded into the spur gear 76 to hold the same stationary.

The shaft 68 is provided with a pair of cylindrical eccentrics 82, 84 intermediate its ends, the eccentrics being of identical configuration with the high sides thereof being disposed 180 degrees apart with respect to each other and being separated by a spacer collar 86. Roller bearings 88, 90 are mounted on each of the eccentrics 82, 84, respectively, the bearings being press-fit within the hubs 92, 94 of a pair of internal spur gears 96, 98.

The internal spur gears 96, 98 are suitably apertured at regularly spaced intervals adjacent the outer marginal circumferential edges thereof to receive a plurality of press-fitted roller bearings 100, 102 therein. The internal spur gears 96, 98 are eccentrically connected together by a crank arm 104 having offset substantially cylindrical integrally connected eccentrics 106, 108 journalled for rotation within the bearings 100, 102, respectively. It is to be noted that the angular positions of the eccentrics 106, 108 correspond, at all times, to the angular positions of the eccentrics 82, 84, respectively.

The internal spur gear 96 is provided with a plurality of circumferentially spaced teeth 110 which are adapted to mesh with the teeth 50, and the internal spur gear 98 is formed with circumferentially spaced teeth 112 adapted to mesh with the gear teeth 78, the teeth 110, 112 extending substantially parallel to the axis of the shaft 58.

At this point it is deemed pertinent to call attention to the fact that here is no rigid connection between the shaft 58 and any of the internal spur gears or other gears of this device. Thus, assuming that the shaft 58 is connected to a power source and is rotating, the internal spur gear 98 under the influence of the eccentric 84 begins to trace its eccentric path as it walks or rotates about the spur gear 76. Simultaneously therewith, the internal spur gear 96, under the influence of the eccentric 82 begins to trace its eccentric path as it walks or rotates about the gear 48 affixed to the output shaft 36. In so moving, eccentric and differential motion is imparted to the internal spur gears 96, 98 through the initial and continuing rotation of the crank arms 104 by means of the eccentrics 106, 108. At least two of the crank arms 104 are required, but three or more are preferable. The offset or throw of each of the crank arms 104 is the same for reasons of dynamic balance, although such a construction is not a necessary one for the operation of the invention. This mode of connection between the internal spur gears 96, 98 is such that a differential radial motion is obtained when the input shaft 58 rotates the eccentrics 82, 84 on which they are mounted, but forces them to rotate as a unit. That is to say, the internal spur gears 96, 98 are constrained to move together in rotation about the power input shaft 58 due to the crank arm connections 104 while the eccentric motion imparted thereto due to the rotation of the eccentrics 82, 84 within them is not constrained.

The power output shaft 36 is, of course, connected to a device (not shown) to be driven.

The operation of the speed reducer 10 may be expressed with mathematical finality. In this connection, when the output shaft is caused to revolve, the eccentrics 82, 84 also revolve with the result that the gear 98 wraps around the spur gear 76, and when the power input shaft 58 makes one rotation, the internal spur gear 98 wraps once around the spur gear 76. Assuming now that the spur gear 76 has $a$ number of teeth and that the internal spur gear 98 bears $b$ number of teeth, upon wrapping once around the spur gear 76, only $a$ number of teeth are used on the internal spur gear 98 so that the internal spur gear 98 is caused to rotate forwardly $$\frac{(b-a)}{b}$$

turns.

Since the internal spur gear 98 is joined to the internal spur gear 96 through the agency of the crank arms 104 in such a manner that they must rotate forwardly as a unit, it follows that the internal spur gear 96 also advances the same number of turns.

When the power input shaft 58 revolves, the internal spur gear 96, being engaged with the gear 48, wraps therearound. Now let the gear 48 bear $c$ number of teeth and the internal spur gear 96 bear $d$ number of teeth. One full turn of the input shaft 58 causes the gear 96 to wrap once around the gear 48. However, the gear 48 bears $c$ number of teeth instead of $d$ number of teeth, hence, gear 48 is caused to rotate in the reverse direction by $$\frac{(d-c)}{c}$$

turns.

However, in addition to the wrapping action, the internal spur gear 96 rotates forwardly $$\frac{(b-a)}{b}$$

turns. The result of this motion is to turn the gear 48 forwardly by $$\frac{(b-a)d}{bc}$$

turns. Hence, the net forward rotation of the gear 48 also of the output shaft 36, is $$\frac{b-a}{b}\cdot\frac{d}{c}-\frac{d-c}{c}=\frac{bc-ad}{bc}$$

turns for one revolution of the power input shaft 58.

Therefore, the speed reduction is given by the equation $$\frac{\text{R.p.m. of output}}{\text{R.p.m. of input}}=\frac{bc-ad}{bc}$$

Now if $bc$ is greater than $ad$, the output shaft 36 will revolve in the same sense as the input shaft 58. But if $bc$ is less than $ad$, the power output shaft 36 will revolve in the reverse sense.

Quite different speed ratios are obtainable by rather small changes in the sizes of the gears. Other speed ratios may be obtained by a reversal in the sense of the gear engagements. For example, the fixed gear 76 could be a ring gear that engages internally with the internal spur gear 98, the internal spur gear 98 now becoming a spur gear. Similarly, the gear 48 could be an internal ring gear attached to the output shaft 36 for engagement, internally with the internal spur gear 96 which now becomes a conventional spur gear.

In an effort to determine the optimum tooth differences between the internal spur gears 96, 98 and the spur gears 48, 76, it has been found that the difference of one tooth between the internal spur gears 96, 98 and the spur gears 48, 76 is not practical since some eighty percent of the teeth thereof must be removed before they will clear one another. This weakens the structure of the teeth beyond any practical use. However, with a difference of two teeth between the internal spur gears and the spur gears, the teeth are made twice as wide on the pitch circle than are the conventional gear teeth. With a difference of four teeth between the internal spur gears and the spur gears, the teeth on the pitch line are four times as wide as the conventional teeth, et cetera. This has the advantage in that it results in the generation of less friction due to the fact that the area of teeth contact is reduced, and the teeth are given greater strength due to their larger cross-sectional areas. It has been found that in order to obtain the maximum efficiency, the number of teeth in the internal spur gears while differing in number from its coacting spur gears, respectively, must be divisible by the difference in the number of teeth. Thus:

| Teeth Difference: | | | | |
|---|---|---|---|---|
| 2 | Internal Spur Gear | $\frac{48}{46}$ | $\frac{54}{52}$ | $\frac{66}{48}$ |
|   | Spur Gear |  |  |  |
| 3 | Internal Spur Gear | $\frac{48}{45}$ | $\frac{51}{48}$ | $\frac{33}{30}$ |
|   | Spur Gear |  |  |  |

The following are examples of speed reduction obtained by employing the instant invention and following the equation $$\frac{(b-a)}{b}\frac{d}{c} - \frac{d-c}{c}$$

wherein the spur gear 76 is provided with 48 teeth ($a$), the internal spur gear 98 is formed with 50 teeth ($b$), the internal spur gear 96 is formed with 56 teeth ($d$), and the spur gear 48 is formed with 54 teeth ($c$). Substituting in the equation the following results are obtained:

$$\frac{50-48}{50} \times \frac{56-54}{54} = +\frac{1}{225} \text{ ratio clockwise}$$

Through the judicious selection of other gear ratios it is possible to rotate the power takeoff or output shaft 36 in a counterclockwise direction without changing the clockwise direction of the rotation of the power input shaft. As an example, let it be assumed that the teeth $a$ are 48 in number, teeth $b$ are 50 in number, teeth $d$ are 48 in number and teeth $c$ are 46 in number. Substituting in the above referred to equation we obtain:

$$\frac{50-48}{50} \times 48 - \frac{48-46}{46} = -\frac{1}{575}$$

ratio counterclockwise.

A unique feature of this invention resides in the fact that with the power input shaft rotating the power output shaft 36 may be held stationary. For example, let $a=48$, $b=50$, $d=50$ and $c=48$. Then substituting in the equation we obtain the following:

$$\frac{50-48}{50} \times \frac{50}{48} - \frac{50-48}{48} = 0$$

ratio output shaft.

Having described and illustrated in detail one embodiment of this invention, it will be understood that the same is offered merely by way of example, and that this invention is to be limited only by the scope of the appended claim.

What is claimed is:

A speed reducer comprising a substantially hollow housing having a pair of opposed open ends, a closure member for each of said open ends, a power input shaft extending through one of said closure members and journalled for rotation within said housing, said power input shaft having a pair of eccentric portions formed thereon intermediate its ends and disposed 180 degrees out of phase, a first spur gear fixedly secured to said one closure member and disposed within said housing in coaxial alignment with said power input shaft, said first spur gear having a number of teeth, a pair of internal spur gears eccentrically connected together to permit differential movement therebetween, each of said internal spur gears, respectively, being mounted on said eccentric portions of said power input shaft, one of said internal spur gears having $b$ number of teeth and meshing with said first spur gear, a power output shaft extending through the other of said closure members and journalled for rotation within said housing, a second spur gear disposed within said housing and fixedly mounted on said power output shaft, said second spur gear having $c$ number of teeth and being meshed with the other of said internal spur gears, the latter having $d$ number of teeth, and wherein the number of teeth between each pair of meshed gears differ in number and are divisible by the difference and whereby the speed reduction ratio may be expressed by the equation $$\frac{(b-a)}{b}\frac{(d)}{c} - \frac{d-c}{c} = \text{ratio} + - \text{or } 0$$

References Cited in the file of this patent

UNITED STATES PATENTS

| 1,365,492 | Hatlee | Jan. 11, 1921 |
| 1,770,035 | Heap et al. | July 8, 1930 |
| 2,108,384 | Moisy | Feb. 15, 1938 |
| 2,168,164 | Kittredge | Aug. 1, 1939 |